(12) United States Patent
Johnson

(10) Patent No.: US 6,820,117 B1
(45) Date of Patent: Nov. 16, 2004

(54) BANDWIDTH MANAGEMENT

(75) Inventor: Christopher L. Johnson, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/420,518

(22) Filed: Oct. 18, 1999

(51) Int. Cl.[7] .......................................... G06F 15/173
(52) U.S. Cl. ..................... 709/223; 709/234; 370/468; 370/469
(58) Field of Search ................... 709/226, 228, 709/230, 234, 232, 223, 233, 224, 225; 370/468, 469, 395.21, 395.41, 477

(56) References Cited

U.S. PATENT DOCUMENTS

| | | | |
|---|---|---|---|
| 6,415,313 B1 * | 7/2002 | Yamada et al. | 709/200 |
| 6,463,470 B1 * | 10/2002 | Mohaban et al. | 709/223 |
| 6,519,636 B2 * | 2/2003 | Engel et al. | 709/223 |
| 6,538,989 B1 * | 3/2003 | Carter et al. | 370/229 |
| 6,560,243 B1 * | 5/2003 | Mogul | 370/468 |
| 2003/0103450 A1 * | 6/2003 | Chapman et al. | 370/229 |

FOREIGN PATENT DOCUMENTS

WO    WO 99/13624    3/1999

OTHER PUBLICATIONS

Engel et al., "Exploring the Performance Impact of QoS Support in TCP/IP Protocol Stacks", Copyright 1998.*
Robert Engel et al., Exploring the Performance Impact of QoS Support in TCP/IP Protocol Stacks, Proceedings IEEE Infocom. The Conference on Computer Communications, US, New York, NY: IEEE, Mar. 29, 1998, pp., 883–892, XP000852074.

* cited by examiner

Primary Examiner—William C. Vaughn, Jr.
(74) Attorney, Agent, or Firm—Blakely, Sokoloff, Taylor & Zafman LLP

(57) ABSTRACT

A method and apparatus for managing bandwidth in a network is described. In one embodiment, the method determines whether a request being transferred from a socket layer to a protocol layer in the operating system is subject to one or more bandwidth limits, and limits data to be transmitted to network protocols to only a portion of the data specified by the request if at least one bandwidth limit exists.

25 Claims, 2 Drawing Sheets

BANDWIDTH MANAGEMENT

FIELD OF THE INVENTION

The present invention relates to the field of bandwidth management on a network; more particularly, the present invention relates to regulating the rate at which data is transferred between the network and a node on the network.

BACKGROUND OF THE INVENTION

Today, Internet Service Providers (ISPs) desire an ability to regulate end user bandwidth and network usage. This is particularly significant if an ISP desires to sell various amounts of network bandwidth. Many mechanisms currently exist to provide this functionality. These mechanisms include regulating end user bandwidth at the network protocol stack (e.g., Internet Protocol (IP) level) on a server, at the network protocol stack (e.g., IP level) on the network, and at the application level in the server.

Regulating end user bandwidth at the protocol layer on the server is usually accomplished by using modified IP software or network device driver and packet scheduling modules that perform rule based regulation based on an IP address, a mask and port number. For instance, a server serving web pages may regulate its access as a means of regulating bandwidth. The regulation that is performed is tightly coupled with the protocol stack and cannot manage name based virtual sites easily. Examples include Bitpro, Linux Traffic Shaper, and FreeBSD "Dummy Net."

Regulating end user bandwidth at the IP level on the network is usually accomplished by using either a filtering mechanism, or a Quality of Service (QoS) model. A filtering model operates on a gateway or router in a manner much like the host base IP regulation. A set of rules are loaded into the filtering system, and traffic is regulated according to those rules. Again, this system cannot easily manage name based virtual sites (e.g., Virtual Hosts) and this model becomes complicated if multiple routes connecting the end systems exist, since the filtering routers would need to coordinate their activities. The Packet Shaper by Packeteer of Cupertino, Calif. is an example of this type of system.

Also at IP level on the network, the Quality of Service (QoS) mechanism allows precise management of network traffic based on network control information that is used by the routers in the network. A particular connection can be identified, and as messages are transmitted through the network, each router ensures that the connection meets the programmed constraints. This mechanism is effective, but it requires support in each router that processes a message and faces the same virtual site and multiple path problems as the filtering method above. An example of this type of system is the Open Policy System by IP Highway.

In order to perform end user bandwidth management at the application level in an application, each application is designed to implement a limit. That is, an application, such as, for example, an Apache or Netscape server, would need to be modified to regulate their byte flow being output. In this way, an ISP or system administrator is enabled to regulate the data rate being produced. However, such regulation requires substantial modification to all applications (servers) that produce content. Also it is very difficult to apply common limits to two servers. In other words, if one wishes to regulate a particular class of users (e.g., an ISP's server allowing access by multiple clients), then all the applications would have to be modified to collaborate and share the bandwidth to meet the bandwidth constraint. Maintaining such collaboration on a server is very difficult. Furthermore, because such regulation is run in user mode, it is independent of the underlying scheduling of applications, which is controlled by the operating system. Therefore, any attempt to guarantee a data rate on the application side can be ignored and prevented by the operating system.

What is needed is a way to avoid these problems.

SUMMARY OF THE INVENTION

A method and apparatus for managing bandwidth in a network is described. In one embodiment, the method determines whether a request being transferred from a socket layer to a protocol layer in the operating system is subject to one or more bandwidth limits, and limits data to be transmitted to network protocols to only a portion of the data specified by the request if at least one bandwidth limit exists.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
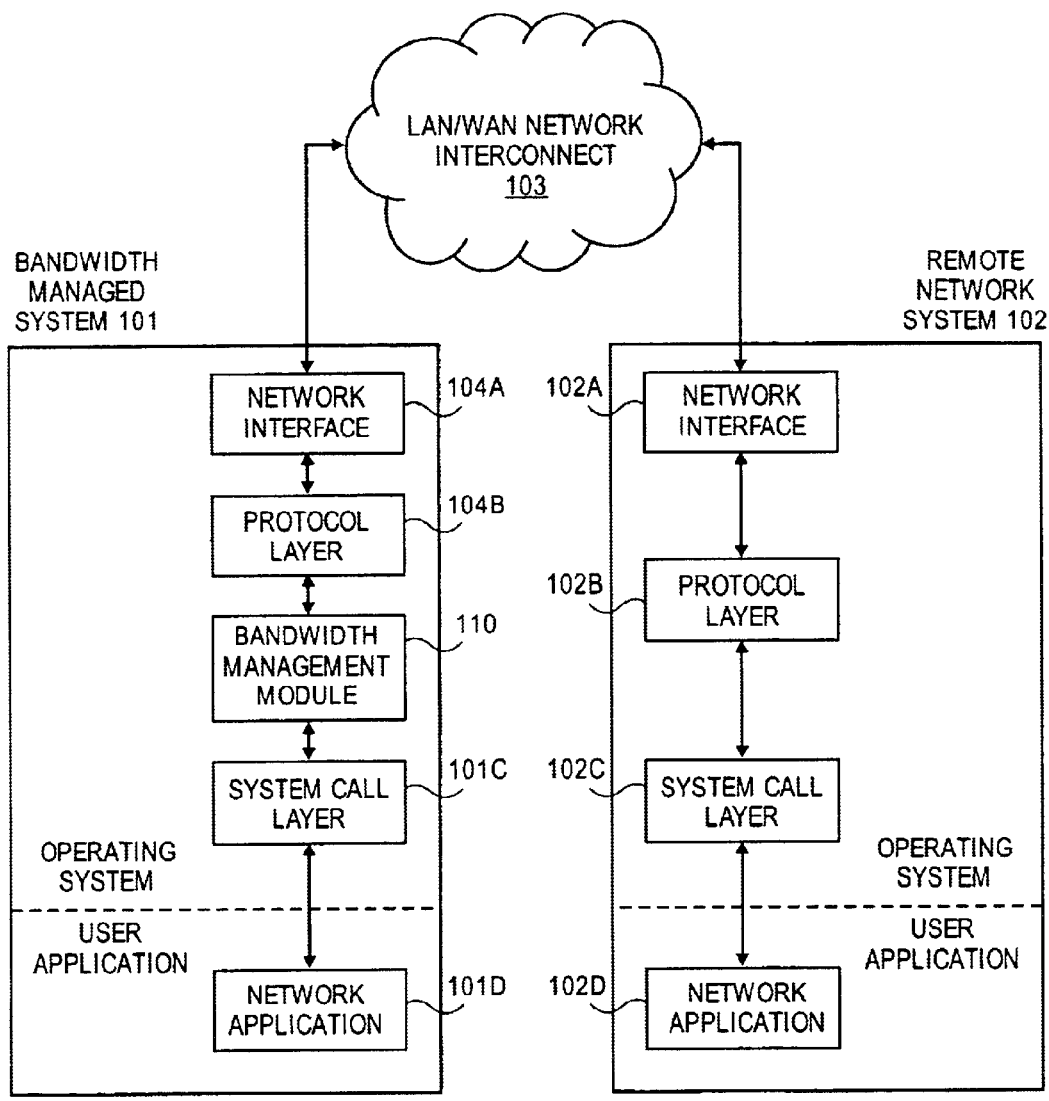
FIG. 1 is a block diagram of one embodiment of a networked environment.

A method and apparatus for restricting network bandwidth are described. In the following description, numerous details are set forth, such as specific protocols, specific operating systems, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. In one embodiment, the computer system may comprise one or more processing devices (e.g., microprocessors, controllers, CPUs, subsystems) coupled together with one or more buses.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Note also that in the following description, a layer may be to a module, and such modules may be software or hardware, or a combination of both.

Overview

The present invention relates to bandwidth management in a network environment. In one embodiment, the bandwidth management comprises regulating the rate data is transferred onto (or off of the network. The bandwidth management is at the application level in the operating system, where the operating system provides mechanisms to set bandwidth limits. Because this control is in the operating system, scheduling may be nearly guaranteed. In one embodiment, a bandwidth limit module is used to perform bandwidth management.

FIG. 1 is a block diagram of a network environment. Referring to FIG. 1, a bandwidth managed system 101 is coupled to and communicates with a remote network system 102 via a network 103. Thus, bandwidth managed system 101 and remote network system 102 operate as nodes on the network. In one embodiment, network 103 may comprise a local area network (LAN) and/or a wide area network (WAN).

Both bandwidth managed system 101 and remote network system 102 have an operating system (101E, 102E) that includes a network interface (101A, 102A) for interfacing to network 103, a protocol layer (101B, 102B), and a system call layer (101C, 102C). The protocol layer may comprise code modules for individual protocols such as TCP, UDP, AppleTalk, etc. The system call layer, also referred to as the socket module, comprises the system interface as a collection of system calls to the operating system to send and receive data and to configure a network connection. The operating system (110E, 102E) interacts with one or more user applications (101D, 102D) in a manner well-known in the art.

Bandwidth limit module (BLM) 110 in system 101 interfaces protocol layer 101B to system call layer 101C. Because BLM 110 is not part of protocol layer 110B, it may operate with any protocol. BLM 110 regulates the input and output of one or more applications on system 101 (i.e., a node) in network 103. BLM 110 regulates the input and output by setting up limits on the amount of network resources consumed in network 103 by applications on system 101. In one embodiment, BLM 110 performs regulation by limiting received or transmitted data according to imposed limits. In one embodiment, BLM 110 regulates usage of network resources by enforcing a limit on classes of users and by providing fair use among members of the same class.

In one embodiment, BLM 110 restricts network bandwidth to a configurable rate. The configurable rates may have differing limits that can be specified for a variety of attributes. That is, a specific connection can be subject to different limits, for example, one limit based on IP address and another limit based on the user identity. In one embodiment, application 101D has several limits based on the various classes that apply to the application. BLM 110 evaluates each limit and applies the limit that fits the current configuration or is most applicable to the application. In one embodiment, application 101D may be limited based on the IP address, user or group identification of the application, and BLM 110 applies the most restrictive limit. A particular user may have a limit that directs BLM 110 to apply this limit in preference to any other potentially applicable limit.

In one embodiment, BLM 110 sets a limit threshold. The limit dynamically adjusts if a configurable byte count limit is exceeded during a configurable time period.

To implement the imposed limits, BLM 110 intercepts I/O at the socket layer. Because the interception is at the socket layer, the protocols do not have to be changed. Thus, no changes are necessary in network 103 or at remote nodes, such as remote network system 102, in order to enforce these limits. The interception may be performed based on a variety of attributes, such as, for example, an address identifier, a user identifier, and/or a group identifier.

In addition, input and output limits can be independent or a single limit can be shared. If input and output limits are independent, there are effectively two limits, with one applying to input packets, and the other applying to output packets. If an application is input and output limited by the same limit, then the single limit applies to the sum of the input and output from that application. If multiple connections share a limit, the BLM 110 delivers data fairly among all the active connections.

An address based limit uses protocol specific support to process the address. In one embodiment, the existing IP routines allow a limit to apply to a specific IP address, or an initial portion of that address and any of the following: a specific higher protocol (e.g. TCP or UDP); all protocols; a specific interface port (e.g. FTP or HTTP); and all ports.

In one embodiment, BLM operates outside of the protocol stack. Thus, the BLM does not disturb any protocol specific algorithms that depend on smooth flowing traffic, such as TCP's slow-start and congestion avoidance system.

Figure 2:
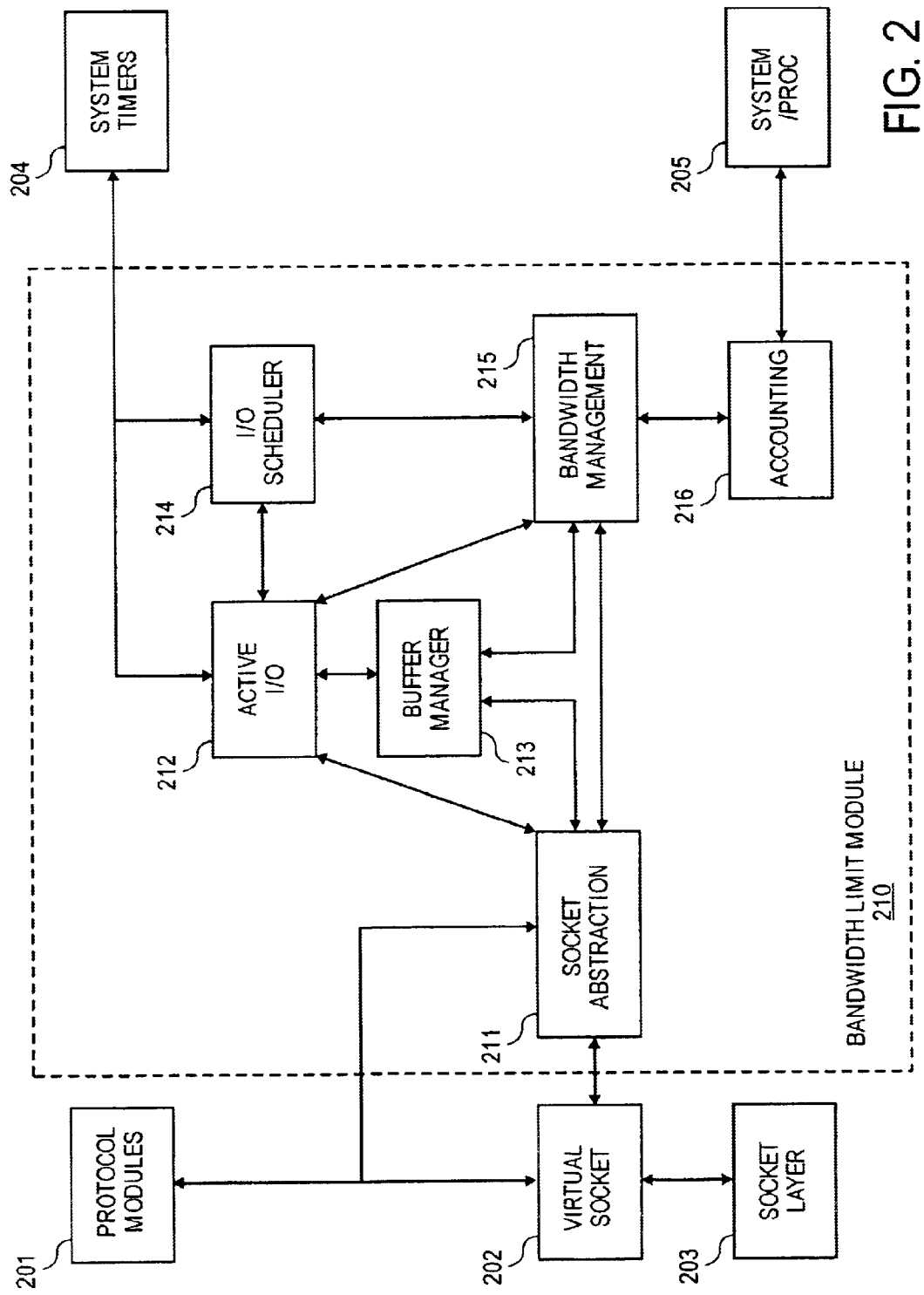
FIG. 2 is a block diagram of one embodiment of a bandwidth limiting module.

FIG. 2 is a block diagram of one embodiment of BLM 210 and the external interfaces to the operating system. In one embodiment, BLM 210 is integrated into the Linux operating system, although the functionality is not operating system dependent. The module may be integrated with the kernel or may comprise a dynamic loading kernel module.

Socket layer 203 is part of the base operating system (e.g., Linux operating system) that is responsible for all network related system services. In one embodiment, these services include creating network connections and performing network input and output (I/O). In a Linux environment, socket layer 203 forwards network requests to various protocol modules 201, such as, for example, TCP/IP or AppleTalk.

Virtual socket layer 202 is inserted between socket layer 203 and the various protocol modules 201. In one embodiment, virtual socket layer 202 is part of the Linux kernel base. Virtual socket layer 202 and BLM 210 may be part of the same module or separate modules. Each interface between socket layer 202 and the various protocol modules 201 allows BLM 210 to process any operation that consumes network bandwidth. BLM 210 may comprise a collection of stubs that adapt requests from socket layer 202 to protocol modules 201.

When socket layer 203 sends a request, virtual socket layer 202 examines the request and determines if it is one which is subject to bandwidth management. If it is, then virtual socket layer 202 intercepts the request and sends it to bandwidth management layer 215. In one embodiment, BLM 210 comprises a separately loadable module. In an alternative embodiment, virtual socket layer 202 intercepts all requests and then a determination is made as to whether the request is subject to bandwidth. In another embodiment, virtual socket layer 202 performs the interception and the determination operations.

Socket abstraction layer 211 is responsible for adapting the underlying interfaces (e.g., Linux interfaces) to the internal interfaces of BLM 210. All user I/O requests are forwarded through socket abstraction layer 211 control operations for BLM 210 are also detected and preprocessed in socket abstraction layer 211.

Bandwidth management layer 215 determines the amount of bandwidth available to each request. In one embodiment, bandwidth management layer 215 determines available bandwidth for each request by examining recent usage statistics in accounting subsystem 216. In an alternative embodiment, an external agent adjusts the limits dynamically. If a request cannot be fulfilled immediately, bandwidth management layer 215 relays the request to the I/O scheduler 214, which uses the timer layer 214 to schedule the request for later processing. When I/O completes, bandwidth management layer 215 updates the accounting information in accounting subsystem 216.

Buffer manager layer 213 allocates and updates all request and I/O data structures. I/O scheduler layer 214 accepts I/O requests from bandwidth manager layer 215, and queues the request until bandwidth is available to transmit the request. When bandwidth is available, I/O scheduler layer 214 forwards the request to active I/O layer 212. Active I/O layer 212 runs at a higher frequency than I/O scheduler 214 and is responsible for initiating I/O requests. When a particular request is run, active I/O layer 212 forwards the request back to socket abstraction layer 211, which in turn invokes the appropriate protocol routine.

Finally, BLM 210 presents status information that can be examined by user programs to determine usage. In one embodiment, this information is presented through the Linux "/proc" filesystem, which is directly readable, with a request to read the statistics processed by BLM 210.

From a data flow perspective, the virtual socket 202 and the bandwidth limit module 210 perform a set of fundamental operations. One of the operations is to act as a bandwidth queue when intercepting the requests that are to be bandwidth managed. Another operation is to manage the data rates that are to be applied. This involves determining what limit applies to the request that has been intercepted and allocating bandwidth based on the limit and the amount of bandwidth already used for that particular limit. Another operation involves use of the timing system to guarantee the transmission of data onto (or off of) the network according to a predetermined schedule. The timing may be based on a high resolution timer or other standard system clock. In alternative embodiments, a hardware level timer may be used to provide the necessary timing.

These operations may be better understood through an example. If a request is made from socket layer 203 to transmit 1000 bytes and this request is subject to management, then the virtual socket 202 intercepts the request and stores it in a bandwidth queue. BLM 210 accesses a memory (e.g., table) to determine the limit currently on this type of request. If the limit indicates that only 100 bytes are allowed to be sent at this time, then the 1000 bytes are divided and only 100 bytes are scheduled for sending at the next scheduling boundary. The remaining 900 bytes are left in the queue for later sending.

Note the limit may even be greater than the number of bytes of a particular request but due to other requests being made that are constrained by the same limit, a particular request may have to be divided or completely prevented from being made, even in part. There may be situations when the size of the transfer is greater than the available bandwidth and the request remains queued until a large enough bandwidth is available.

From a control perspective, BLM 210 is able to impose limits on the bandwidth that is given to certain types of requests. As discussed above, exemplary limits may involve having a set limit on a particular sequence of IP addresses. In one embodiment, the limits are maintained in a configuration database along with the attribute of the request used to identify those requests that are to be bandwidth managed. A user interface may be used to interface to the configuration database to store, delete or change information stored therein. When limits are added, deleted or changed, the configuration database sends a configuration request with the necessary information to implement the limit to socket layer 203, which forwards the configuration request to set the limit to virtual socket 202. Virtual socket 202 forwards the information to BLM 210.

In the event that multiple limits apply to a several connections, it may be difficult to determine the correct apportionment of bandwidth among the users. For example, consider a system with 5 active users of limit A, which is set to 100, and 2 active users of limit B, which is set to 500. If connection X is limited by A and B, and connection Y is only limited by B, then there are two orders of calculations. If Y is calculated first, then $$\text{Bandwidth}(Y) = \text{Limit } A/2 = 250$$

$$\text{Bandwidth}(X) = \text{Limit } B/5 = 20$$

In the above calculation, Limit A is only partially consumed, because Y was assigned an allocation when it appeared that some bandwidth should be reserved for the other connection using Limit A. To fully utilize Limit A, if would be necessary to rescan the list and recalculate the utilization.

On the other hand, in one embodiment X is calculated first.
Therefore, $$\text{Bandwidth}(X) = \text{Limit } B/5 = 20$$

$$\text{Bandwidth}(Y) = \text{Remaining Limit}(A) = 480$$

It is clear that the second calculation uses the resource limits in a more efficient manner, since both limit A and Limit B are fully exhausted.

In one embodiment, BLM 210 addresses this problem in I/O scheduler 214, which maintains the list of pending requests in the order of the preceding allocation, from smallest to largest. In this way, when I/O scheduler 214 examines the list, severely limited connections are processed first, and given an opportunity for a fair share. If these connections are still limited, the unused bandwidth is still available for the larger consumers as they are examined.

As limits fluctuate, connections can move up and down in the list, and resources may be underallocated as in the example above. However, the algorithm has efficiencies since the list is only scanned a single time during each scheduling opportunity.

Utilizing the data and control flows discussed above, BLM 210 controls the transmit path of information onto (or off of) the network. BLM 210 allows a transmission to continue if no bandwidth limits are set. If a limit has been set, BLM 210 looks up the bandwidth limit(s) and locates the minimum. BLM 210 permits the request to continue if it meets the current limit. If the request cannot meet the current limit, BLM 210 copies the message or shares its virtual map to access without copying and calculates the amount of time that is necessary to transmit in the next I/O clock interval. BLM 210 enqueues an active I/O request for the I/O clock interval and queues any remaining data (i.e., data that could not be sent in the I/O clock interval because of the limit) on a pending message list. The I/O queue then transmits any messages due, waking up periodically to continue. The scheduler 214 periodically moves new messages to I/O queue.

One Embodiment of the Virtual Socket Layer

Virtual socket layer 202 interposes itself between socket layer 203 and protocol modules 201. If the operating system comprises Linux, protocols represented by protocol modules 201 use a standard interface to register a collection of routines with socket module layer 203.

If the operating system comprises Linux, the protocol interface includes the following functions: create, dup, release, vind, connect, socketpair, accept, getname, poll, ioctl, listen, shutdown, setsockopt, getsoskopt, fcntl, sendmsg, recvmsg, which are well-known in the art. Each of these routines has a corresponding routine in the virtual socket 202 (or other module), with a similar name (in one embodiment), such as bw_sock_dup corresponding to the protocol dup routine. Socket layer 203 then uses these routines to forward requests to protocol modules 201.

In one embodiment, virtual socket layer 202 also has a registration interface for BLM 210. Routines discussed below are performed by BLM 210. In one embodiment, these routines are bypassed if BLM 210 (or any other BLM) is not registered. In one embodiment, all of the routines of BLM 210 discussed are in socket abstraction layer 211. These routines include the following: sock_register (protocol family information); sock_unregister (protocol family); bw_sock_register_mgmt (BLM functions); bw_sock_unregister_mgmt( ); bw_sock_docreate( ); bw_sock_dup( ); bw_sock_bind( ); bw_sock_connect( ); bw_sock_socketpair( ); bw_sock_accept( ); bw_sock_getname( ); bw_sock_poll( ); bw_sock_ioctl( ); bw_sock_listen( ); bw_sock_release( ); and bw_sock_shutdown( ).

The sock_register (protocol family information) routine is used by protocols to register for network I/O. In one embodiment, the sock_register routine saves the protocol family information and calls real socket registration routine in socket layer 203. This causes socket layer 203 to forward requests for each protocol to the virtual socket 202.

A sock_unregister(protocol family) routines is used by protocol modules 201 to remove themselves from the system. In one embodiment, the sock_unregister routine calls the real socket unregistration routine in socket layer 203 and releases the protocol family information.

A bw_sock_register_mgmt (BLM functions) routine is used by socket abstraction layer 211 to register with virtual socket layer 202. In one embodiment, this routine saves the interface functions of BLM 210 for later use by BLM 210.

A bw sock_unregister_mgmt( ) routine is used by socket abstraction layer 211 to unregister from virtual socket layer 202. In one embodiment, this routine discards the interface routines of BLM 210.

A bw_sock_docreate( ) routine operates as a virtual interface to create a new network connection. In one embodiment, this routine calls the bw_newconnection( ) routine of BLM 210 and calls the protocol create routine.

A bw_sock_dup( ) routine is used to duplicate an existing network connection. In one embodiment, this routine calls the duplicate routine bw_dupconnection( ) of BLM 210 and calls the protocol duplicate routine.

A bw_sock_bind( ) routine is used to associate a local network address with a network connection. In one embodiment, this routine calls the protocol bind routine and calls the bw_setaddr( ) routine of BLM 210 to set the address.

A bw_sock_connect( ) routine is used to set the remote address for a network connection. In one embodiment, this routine calls the protocol connect routine and calls the bw_setaddr( ) routine, of BLM 210 to set the address.

A bw_sock_socketpair( ) routine interconnects two network channels. In one embodiment, this routine calls the protocol socketpair routine.

A bw_sock accept( ) routine is used to receive a new incoming connection. In one embodiment, this routine calls the protocol accept routine, and then calls bw_setaddr( ) routine of BLM 210 to set the address.

A bw_sock_getname( ) routine returns the address of a network connection. In one embodiment, this routine calls the protocol getname routine.

A bw_sock_poll( ) routine is used to request notification when I/O can be performed. In one embodiment, this routine calls the protocol routine, calls the bw_post_poll( ) routine of BLM 210 and passes the result of the protocol poll routine.

A bw_sock_ioctl( ) routine operates as a general purpose interface for a wide variety of requests. The specific behavior will be described in detail below in conjunction with socket abstraction layer 211. In one embodiment, this routine calls the protocol ioctl routine, calls the bw_post_ioctl( ) routine of BLM 210, and passes the result of the protocol ioctl routine.

A bw_sock_listen( ) routine waits for an incoming connection. In one embodiment, this routine calls the protocol listen routine.

A bw_sock_release( ) routine is used to delete a network connection. In one embodiment, this routine calls the protocol release routine and calls the bw_delconnection( ) routine of BLM 210 to delete the connection.

A bw_sock_shutdown( ) routine is used to disconnect a network connection. In one embodiment, this routine calls the protocol shutdown routine. A bw_sock_setsockopt( ) routine adjusts protocol specific features of network connections. In one embodiment, this routine calls the protocol setsockopt routine. A bw_sock_getsockopts( ) routine retrieves the settings of protocol specific features. In one embodiment, this routine calls the protocol getsockopt routine. A bw_sock_fcntl( ) routine retrieves the settings of protocol specific features. In one embodiment, this routine calls the protocol fcntl routine. A bw_sock_sendmsg( ) routine sends a message out a network connection. In one embodiment, this routine calls the bw_do_sendmsg( ) routine of BLM 210. A bw_sock_recvmsg( ) routine receives a message from the network. In one embodiment, this routine calls the bw_do_recvmsg( ) routine of BLM 210.

One Embodiment of the Socket Abstraction Layer

Socket abstraction layer 211 is responsible for converting virtual socket requests of virtual socket 202 into the various BLM internal interfaces. It is possible for a particular connection to be unmanaged if the connection was created before BLM 210 was loaded. In this case, the following routines call the protocol specific routine, or do nothing if virtual socket layer 202 already called the protocol routine. In one embodiment, the routines of the socket abstraction layer 211 include: init_module( ), cleanup_module( ), bw_newconnection( ), bw_dupconnection( ), bw_delconnection( ), bw_setaddr( ), bw_post_poll( ), bw_post_ioctl( ), bw_do_poll_ok( ), bw_do_sendmsg( ), bw_sock_dosendmsg( ), bw_do_recvmsg( ), bw_sock_dorecvmsg( ), and bw_io_complete( ) and are described in further detail below in terms of the function(s) performed.

An init_module( ) routine is used to load the BLM 210 dynamically. In one embodiment, this routine registers accounting status routines with the '/proc' service 205, initializes data structures, and registers the interface functions to socket abstraction 211 with virtual socket layer 202.

A cleanup_module( ) routine is used to remove a dynamic module from a running system. In one embodiment, this routine unregisters socket abstraction 211 interface functions from virtual socket layer 202, allows any pending I/O requests to complete, and unregisters the BLM status interface functions from the '/proc' service 205.

A bw_newconnection( ) routine creates a new connection for BLM 210 to manage. In one embodiment, this routine allocates and initializes the per connection storage which BLM 210 uses to cache information about the connection, such as what limits constrain the connection and what IP address the connection is using. In one embodiment, this storage area also includes the Linux structures for stopping and starting an application.

A bw_dupconnection( ) routine duplicates an existing connection. In one embodiment, this routine calls bw_newconnection( ) to create a new network connection, and duplicates any address information present in the existing connection.

A bw_delconnection( ) routine deletes a connection. In one embodiment, this routine cancels any pending I/O requests, releases any references to bandwidth limits, and deallocates the per connection storage.

A bw_setaddr( ) routine calls a bw_setip( ) routine of BLM 210 that is protocol specific that sets the address information that is be used to bandwidth limit the connection. In one embodiment, this routine calls a bw_setugid( ) routine in bandwidth management layer 215 to specify the identity of the connection.

A bw_post_poll( ) routine is called by the bw_sock_poll( ) routine of virtual socket 202 after the protocol poll routine to determine if a bandwidth limit should constrict the amount of data the protocols believe is available. In one embodiment, this routine performs as follows. The routine first checks with bandwidth management layer 215 to see if BLM 210 permits this operation if the protocol layer has data to deliver or space for data to be transmitted. If the operation is unlimited, this routine allows it to proceed. Otherwise, this routine calls buffer manager 213 to create a request for bandwidth and arranges for the completion notification to be delivered for the poll when the bandwidth is available. If the poll operation is restricted, the routine adjusts the results from the protocol module to reflect the limit.

A bw_post_ioctl( ) routine is called by the bw_sock_ioctl( ) routine of virtual socket 202 after bw_sock_ioctl forwards the request to the protocol ioctl routine. The bw_post_ioctl( ) determines if any bandwidth limits should adjust the results from the protocol. Also, this routine processes control requests issued to BLM 210. In one embodiment, this routine performs as follows. If a BLM bandwidth limit is being set or adjusted, this routine forwards the request to bandwidth management layer 215. If a BLM bandwidth limit is being deleted, this routine forwards requests of BLM 210 to set the user or group identifier of a connection to bandwidth management layer 215. This routine then forwards that request to set the user or group identifier of a connection to bandwidth management layer 215. If the request is a request to determine the amount of data available, this routine checks with bandwidth management layer 211 to see if BLM 210 allows this operation. If a limit is pending, then this routine calls buffer manager 213 and creates a request to allocate the specified amount of bandwidth.

A bw_do_poll_ok( ) routine is called by active I/O layer 212 when bandwidth is allocated for a poll or ioctl request. In one embodiment, this routine updates the space available for this connection.

A bw_do_sendmsg( ) routine is called to transmit messages. In one embodiment, this routine performs as follows. If an error occurred on a previous send request that has not been delivered, this routine returns that error. This can happen because I/O requests can partially succeed, in which case a success indication is returned and an error indication on the following request. This routine calls buffer manager 213 to create an I/O request and checks with bandwidth management layer 215 to see if the request can be processed immediately. If so, this routine calls the protocol, updates the accounting information in accounting 216 and returns. If a limit restricts the flow, this routine calls the protocol to send any initial portion that is permitted. If this is a non-blocking request, this routine returns the result. If this request is allowed to block, this routine forwards the request to bandwidth management layer 215 and uses the operating system sleep interface to stop the application until the I/O request completes or is interrupted. After blocking, if an interrupt occurred, this routine cancels the I/O request and the calls the buffer manager 213 to release the request. Thereafter, the routine returns the results.

A bw_sock_dosendmsg( ) routine is called by active I/O layer 212 to send messages to the protocol layer. In one embodiment, this routine calls the protocol sendmsg routine that was registered with the sock_register( ) routine of socket 202.

A bw_do_recvmsg( ) routine is called to deliver incoming messages to a user application, In one embodiment, this routine performs as follows. If an error occurred on a previous receive request that has not been delivered, this routine returns that error. This routine then calls buffer manager 213 to create an I/O request and calls the protocol ioctl routine to determine how much data is available for delivery. Afterwards, the routine checks with bandwidth management layer 215 to see if the request can be processed immediately. If so, the routine delivers the data as described below, updates the accounting information, and returns. If a limit restricts the flow, the routine delivers the data as described below (to deliver any initial portion that is permitted). If this is a non-blocking request, the routine returns the result. If this request is allowed to block, the routine forwards the request to bandwidth management layer 215 and uses the operating system sleep interface to stop the application until the I/O request completes or is interrupted. After blocking, if an interrupt occurred, the routine cancels the I/O request, delivers the data to the application, and calls buffer manager 213 to release the request. Thereafter, the routine returns the results. Delivery of received messages depends on the operating system facilities. In one embodiment, the data is delivered by calling the protocol recvmsg routine. In one embodiment, the data is delivered by socket layer 203.

A bw_sock_dorecvmsg( ) routine is called by active I/O layer 212 to receive incoming messages. In one embodiment, this routine calls the protocol receive message routine.

A bw_io_complete( ) routine is called from active I/O layer 212 to complete an I/O request. In one embodiment, this routine wakes up any sleeping applications and deallocates structures allocated for poll and ioctl requests.

One Embodiment of the Bandwidth Management Layer

Bandwidth management layer 215 is responsible for all bandwidth related operations, including determining if a limit applies to a particular connection, dividing limits fairly among multiple users, and accounting for usage.

In one embodiment, bandwidth management layer 215 uses the following routines: bw_new_limit( ), bw_delete_limit( ), bw_setip( ), bw_setugid( ), bw_io_check( ), bw_io_alloc( ), bw_io_update( ), bw_q_io( ).

A bw_new_limit( ) routine is called from the ioctl( ) routine of socket abstraction layer 211 to adjust an existing limit or create a new limit. In one embodiment, this routine performs as follows. For each supported type of limit, this routine ensures that the values are valid. Then the routine looks up the existing limit or creates a new limit. Afterwards, the routine searches the unlimited connection list in case the new limit applies to any previously unregulated connections. The routine adjusts the appropriate values in the limit. In one embodiment, values that may be adjusted include the bandwidth limit, the byte count threshold, the secondary limit if the byte count threshold is exceeded, and the byte count threshold time interval.

A bw_delete_limit( ) routine is called from the ioctl( ) routine of socket abstraction layer 211 to delete a limit. In one embodiment, the routine ensures that the values are valid for each supported type of limit. The routine also deletes the limit, or if the limit is in use by active requests, marks it for later deletion.

A bw_setip( ) routine is called from the bw_setaddr( ) routine of socket abstraction layer 211 to set the IP address on a network connection. In one embodiment, this routine performs as follows. This routine initially deletes any existing limit, sets the address fields, looks up and sets the input limit if one exists, and looks up and sets the output limit if one exists. If a particular read or write limit does not exist, this routine adds the connection to the list of unlimited connections so that future limits can be applied if necessary (see the bw_new_limit( ) routine above).

A bw_setugid( ) routine is called from socket abstraction layer 211 to set the user and group identifiers for a particular connection. In one embodiment, this routine performs as follows. This routine initially deletes any existing limit, sets the group and user identifier fields, and looks up and sets the user and group input and output limits. If a particular limit does not exist, this routine adds the connection to the user or group unlimited connection list.

A bw_io_check( ) routine determines if a particular I/O request can proceed and allocates a fair share of the available bandwidth to this request. This routine is called from socket abstraction layer 211 (the bw_post_poll, bw_post_ioctl, bw_do_sendmsg, and bw_do_recvmsg routines) and from the I/O scheduler layer 214 (the bw_do_sched routine). In one embodiment, this routine performs as follows. If there is an allocation remaining from a previous I/O or poll request, and the current request fits, the routine allows the request to proceed. The routine then examines each limit that applies to the connection. If the limit is marked for deletion (see the bw_delete_limit routine above), the routine deletes the limit if possible. Afterwards, the routine uses the bw_io_alloc routine (described below) to allocate bandwidth from each limit. If the available bandwidth differs among the various limits, the minimum available bandwidth is used and the surplus is returned to limits that were overallocated. If the resulting allocation is below a threshold, and this allocation does not finish the request, the routine associates the allocation with request, but defers the I/O. This threshold improves network efficiency by avoiding large numbers of very small messages. In one embodiment, a minimum threshold of 512 bytes is enforced. If I/O can be performed the routine return the time when the I/O should be executed.

A bw_io_alloc( ) routine is an internal routine to bandwidth management layer 215 that calculates the specific allocation available on a particular limit, and the time at which that I/O can be performed. In one embodiment, the routine operates as follows. If there is no limit, then the full request can be performed at any time. If there are multiple requests pending for this limit, the remaining bandwidth in this scheduling window is divided by the number of other users of this limit who have not yet received an allocation during the current scheduling window. In one embodiment, the I/O time for this request is determined by the dividing the allocation from this limit excluding the current request by the total allocation available on this limit during this scheduling window.

A bw_io_update( ) routine calls accounting layer 216 to update statistics after an I/O request is completed. Bw_io_update is called by socket abstraction layer 211 (the bw_do_sendmsg, bw_do_recvmsg routines), and the active I/O layer 212 (the bw_do_some_active routine). In one embodiment, this routine performs as follows. The routine initially updates the request, calls the accounting layer 216 to update the global statistics, and calls the accounting layer 216 to update the statistics for each limit that applies to the current request. If the I/O request did not exhaust the allocation, this routine associates any surplus with the request for later use. If this request pushes the limit beyond the byte count threshold, then this routine adjusts the limit to reflect the threshold exceeded limit.

A bw_q_io( ) routine is called from socket abstraction layer 211 to enqueue a new request that is limited. In one embodiment, this routine uses the bw_io_check( ) routine to see if any I/O can be performed in the next active I/O window. If so, this routine calls the active I/O routine to perform the I/O request. If there is still data in the request, the routine forwards it to the I/O scheduling layer 214.

One Embodiment of the Accounting Layer

Accounting layer 216 handles accounting with a time counter, which associates time sensitive data with a timestamp. All operations on these structures check the time stamp and update the time sensitive data only if the timestamp matches the current time. Otherwise, the time sensitive data is stale, and it is replaced with the new value. In one embodiment, there is a data structure associated with each limit.

In one embodiment, a radix index of the current time is used to access the time stamp structures. By using a radix index of the current time into a array of time stamp structures, statistics can be tracked over a period of time without needing to employ complex aging algorithms. For example, in one embodiment, the per minute usage is stored in an array of 16 time stamped counters. When I/O is completed, the following algorithm increments the statistics by count:

```
index=current_time % 16
if (array[index].time!=current_time){
array[index].time=current_time;
array[index].count=count
}
else array[index].count+=count;
```

This mechanism means that the usage statistics always correspond to the correct timer interval, and when the system is quiescent there is no need to adjust the statistics based on the passage of time.

In one embodiment, accounting layer 216 uses the following routines: a bw_update_universe( ) routine and a bw_io_done( ) routine. The bw_update_universe( ) routine updates the traffic usage statistics. In one embodiment, this routine updates the global counters and updates the per minute time counter. The bw_io_done( ) routine updates the usage for the bandwidth allocation. In one embodiment, this routine updates the I/O scheduling window time counters and updates the total byte count counters.

One Embodiment of the I/O Scheduling Layer

I/O scheduling layer 214 performs I/O scheduling at a coarser granularity than the active I/O layer 212 performs I/O. This means that there are several slots of active I/O layer 212 in a I/O scheduling period. These slots are referred to herein as the I/O scheduling window, and one of the key activities of BLM 210 is to determine which slot in a particular window should be used. This calculation is done in bandwidth management layer 215 using the bw_io_alloc( ) routine.

These scheduling windows are double buffered, so that active I/O layer 212 can be performing I/O from one window while I/O scheduler 214 is inserting requests into the following window.

In one embodiment, I/O scheduling layer 214 uses the following routines: the bw_do_q_sched routine and the bw_do_sched( ) routine.

The bw_do_q_sched( ) routine is called by bandwidth management layer 215 to add a request to the I/O scheduling list. In one embodiment, this routine performs as follows. First, the routine adds the request to the list. This routine sorts the list of I/O scheduler 214 in order of the size of the last I/O allocation, with the smallest allocation at the front of the list. If the I/O scheduler timer is not active, the routine the enables the timer.

The bw_do_sched( ) routine is called from timer interface 204 (e.g. a Linux timer interface) and performs as follows. First this routine examines the I/O scheduling list and forwards requests that can proceed to active I/O layer 212. In one embodiment, for every I/O request on the I/O queue, this routine calls bandwidth management layer 215 to determine if an I/O request can be issued in this scheduling window. If the request can perform I/O, this routine forwards it to active I/O layer 212. If there is still data pending, this routine inserts the request back on the I/O scheduling list.

One Embodiment of Active I/O Layer

Active I/O layer 212 is responsible for issuing the I/O call. In one embodiment, active I/O layer 212 uses the following routines: bw_do_q_active( ) and bw_do_active( ) and bw_do_active( ).

The bw_do_q_active( ) routine adds a request to the queue associated with the I/O time slot that bandwidth management layer 215 selected.

The bw_do_q_active routine is called by bandwidth management layer 215 (e.g., the bw_q_io routine) and I/O scheduler layer 214 (e.g., the bw_do_sched routine). In one embodiment, this routine adjusts the request based on the I/O that is about to be performed, inserts the request into the appropriate I/O slot, and starts the active I/O timer of active I/O layer 212 if it is not running.

The bw_do_active( ) routine is called by timer interface 214 (e.g., the Linux timer interface) and starts the I/O requests that are ready to run in the current time slot. In one embodiment, the routine performs as follows. First, for each request ready to schedule, the routine performs the following steps. The routine initially calls buffer manager layer 215 to adjust the I/O request for the current portion of the I/O. The routine then calls the I/O function in socket abstraction layer 211 to perform the actual I/O. The routine may call either of the bw_do_poll_ok, bw_sock_dosendmsg, or bw_sock_dorecvmsg routine. In one embodiment, this routine calls bandwidth management layer 215 (e.g., the bw_io_update routine) to update accounting statistics. If the whole I/O request is finished, this routine calls the bw_io_complete routine in socket abstraction layer 211 to perform the final cleanup. If an error occurred, the routine cancels the pending request and returns any partial success status or the error. If there is more I/O necessary for this request, the routine calls the routine buffer manager 213 to adjust the request to reflect the completed I/O and, if necessary, re-enqueues the request on I/O scheduler layer 214, and re-arms the active I/O timer of active I/O layer 212 for the next I/O slot.

One Embodiment of the Buffer Manager Layer

Buffer manager layer 217 manages the actual I/O request structure and the buffer that is associated with the pending request. In one embodiment, buffer manager layer 213 performs these functions using the following routines: bw_initioreq( ), bw_iov_front_( ), bw_iov_pullup( ), and bw_iov_copyin( ).

The bw_init_ioreq( ) routine is called by socket abstraction layer 211 whenever a I/O request is processed by BLM 210. The calling routine allocates the actual request structure, typically on the stack, but the bw_init_ioreq routine initializes the various fields based on the implementation of buffer manager 213. In one embodiment, this routine performs as follows. The routine initially sets the message description fields in the I/O request to match the parameters in the application request. If there is bandwidth preallocated for the network connection, this routine associates it with the request. This can happen if a previous request had partial success, but had some I/O error after bandwidth was allocated.

The bw_delete_ioreq( ) routine is called by socket abstraction layer 211 to delete an I/O request. In one embodiment, this routine performs as follows. First, if there is bandwidth allocated to the I/O request that was not used, the routine returns it to the network connection.

The bw_iov_front( ) routine is called the active I/O layer 212 to adjust an I/O request to only include the leading portion of the request for partial I/O. In one embodiment, this routine updates the memory pointers and structures to only reference the leading portion of the request.

The bw_iov_pullup( ) routine is called by active I/O layer 212 to update the memory buffers of an I/O request to reflect completed I/O. In one embodiment, this routine adjusts the base address and length of an I/O request by the number of bytes actually transferred.

The bw_iov_copyin( ) routine is called by socket abstraction layer 211 to move outgoing messages into the system memory for the eventual transmission. In one embodiment, this routine allocates a memory buffer, copies the message into the buffer, and initializes the I/O request to reference the buffer.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a method and apparatus for bandwidth management has been described.

I claim:

1. A method for managing bandwidth in a network using a system coupled to the network and running an operating system, the method comprising:
   determining whether a request being transferred from a socket layer to a protocol layer in the operating system is subject to one or more bandwidth limits;
   limiting data to be transmitted to the protocol layer to only a portion of the data specified by the request if at least one bandwidth limit exists, wherein an amount of the portion of the data is determined based on the at least one bandwidth limit;
   maintaining a list of pending requests captured before reaching the protocol layer in an order of preceding allocation from smallest to largest, and processing requests having more limited connections prior to processing those having less limited connections;
   dividing a remainder of bandwidth in a next scheduling window by a number of other users of the at least one bandwidth limit who have not received an allocation during a current scheduling window that precedes the next scheduling window;
   maintaining a data structure for each limit, and determining an amount of available bandwidth by examining recent usage statistics as indicated by examining the data structures;
   maintaining a time stamp in each data structures;
   using one of the data structures if the time stamp indicates that the data is not stale; and
   updating data in said one of the data structures if the data is not stale.

2. The method defined in claim 1 further comprising capturing the request before the packet reaches the protocol layer.

3. The method defined in claim 2 wherein capturing is performed prior to determining whether the request is subject to the one or more bandwidth limits.

4. The method defined in claim 1 further comprising transmitting all data associated with the request to the protocol layer if no bandwidth limits corresponding to the request are set.

5. The method defined in claim 1 further comprising transmitting all data associated with the request to the protocol layer if the amount of data associated with the request meets a current limit set for a type of request.

6. The method defined in claim 1 further comprising
   enqueuing an input/output (I/O) request corresponding to the request, the I/O request for transmitting the portion of data to the protocol layer; and
   enqueuing remaining data associated with the request on a pending message list for transmission in the future.

7. An apparatus for managing bandwidth in a network using a system coupled to the network and running an operating system, the apparatus comprising:
   means for determining whether a request being transferred from a sock et layer to a protocol layer in the operating system is subject to one or more bandwidth limits;
   means for limiting data to be transmitted to the protocol layer to only a portion of the data specified by the request if at least one bandwidth limit exists, wherein an amount of the portion of the data is determined based on the at least one bandwidth limit;
   means for maintaining a list of p ending requests captured before reaching the protocol layer in an order of preceding allocation from smallest to largest, and processing requests having more limited connections prior to processing those having less limited connections;
   means for dividing a remainder of bandwidth in a next scheduling window by a number of other users of the at least one bandwidth limit who have not received an allocation during a current scheduling window that precedes the next scheduling window;
   means for maintaining a data structure for each limit, and determining an amount of available bandwidth by examining recent usage statistics as indicated by examining the data structures;
   means for maintaining a time stamp in each of the data structures;
   means for using one of the data structures if the time stamp indicates that the data is not stale; and
   means for updating data in said one of the data structures if the data is not stale.

8. The apparatus defined in claim 7 further comprising means for capturing the request before the packet reaches the protocol layer.

9. The apparatus defined in claim 8 wherein the means for capturing operates prior to the means for determining determines whether the request is subject to the one or more bandwidth limits.

10. The apparatus defined in claim 7 further comprising means for transmitting all data associated with the request to the protocol layer if no bandwidth limits corresponding to the request are set.

11. The apparatus defined in claim 7 further comprising means for transmitting all data associated with the request to the protocol layer if the amount of data associated with the request meets a current limit set for a type of request.

12. The apparatus defined in claim 7 further comprising
   means for enqueuing an input/output (I/O) request corresponding to the request, the I/O request for transmitting the portion of data to the protocol layer; and
   means for enqueuing remaining data associated with the request on a pending message list for transmission in the future.

13. A system comprising:

a network interface;

a processing device executing an operating system and an application program, the application program operable to generate a request to transfer through the network interface, wherein the operating system comprises:

a protocol module;

a socket module;

a virtual socket module interfacing the protocol module and the socket module;

a bandwidth limit module to capture a request being transferred from the socket module to the protocol module, determine whether the captured request is subject to one or more bandwidth limits, limit data being transmitted onto a network to only a portion of the data specified by the request if at least one bandwidth limit exists, wherein an amount of the portion of the data is determined based on the at least one bandwidth limit, maintaining a list of pending requests captured before reaching the protocol layer in an order of preceding allocation from smallest to largest, and processing requests having more limited connections prior to processing those having less limited connections, divide a remainder of bandwidth in a next scheduling window by a number of other users of the at least one bandwidth limit who have not received an allocation during a current scheduling window that precedes the next scheduling window, maintain a data structure for each limit, and determining an amount of available bandwidth by examining recent usage statistics as indicated by examining the data structures, maintain a time stamp in each of the data structures, use of the data structures if the time stamp indicates that the data is not stale, and update data in said one of the data structures if the data is not stale.

14. The system defined in claim 13 wherein the bandwidth limit module further comprising:

a socket abstraction module to interface to the virtual socket module;

a bandwidth manager coupled to socket abstraction module;

a buffer manager coupled to the socket abstraction module and the bandwidth manager;

an active I/O module coupled to the buffer manager; and a I/O scheduler coupled to the active I/O module.

15. The system defined in claim 14 further comprising an accounting module coupled to the bandwidth manager to maintain usage information.

16. The system of claim 15, wherein the bandwidth manager determines available bandwidth for the request by examining recent usage statistics stored in the accounting module.

17. The system of claim 16, wherein the I/O scheduler accepts the request from bandwidth manager, queues the request until bandwidth is available, and forwards the request to active I/O module when the bandwidth is available.

18. The system of claim 17, wherein the active I/O module forwards the request received from the I/O scheduler to the socket abstraction, where an appropriate protocol routine is invoked.

19. The system of claim 14, wherein the buffer manager allocates and updates one or more data structures associated with the request, at least a portion of the data structures being used to store a remainder of the data.

20. An article of manufacture having at least one recordable media having executable instructions stored thereon which, when executed by at least one processing device, cause the processing device to:

determine whether a request being transferred from a socket layer to a protocol layer in an operating system is subject to one or more bandwidth limits, limit data to be transmitted to the protocol layer to only a portion of the data specified by the request if at least one bandwidth limit exists, wherein an amount of the portion of the data is determined based on the at least one bandwidth limit, wherein the executable instructions further cause the processing device to maintain a list of pending requests captured before reaching the protocol layer in an order of preceding allocation from smallest to largest, and processing requests having more limited connections prior to processing those having less limited connections, divide a remainder of bandwidth in a next scheduling window by a number of other users of the at least one bandwidth limit who have not received an allocation during a current scheduling window that precedes the next scheduling window, maintain a data structure for each limit, and determining an amount of available bandwidth by examining recent usage statistics as indicated by examining the data structures, maintain a time stamp in each of the data structures, use one of the data structures if the time stamp indicates that the data is not stale, and update data in said one of the data structures if the data is not stale.

21. The article of manufacture defined in claim 20 wherein the executable instructions further cause the processing device to capture the request before a packet reaches the protocol layer.

22. The article of manufacture defined in claim 21 wherein capturing is performed prior to determining whether the request is subject to the one or more bandwidth limits.

23. The article of manufacture defined in claim 20 wherein the executable instructions further cause the processing device to transmit all data associated with the request to the protocol layer if no bandwidth limits corresponding to the request are set.

24. The article of manufacture defined in claim 20 wherein the executable instructions further cause the processing device to transmit all data associated with the request to the protocol layer if the amount of data associated with the request meets a current limit set for a type of request.

25. The article of manufacture defined in claim 20 wherein the executable instructions further cause the processing device to enqueue an input/output (I/O) request corresponding to the request, the I/O request for transmitting the portion of data to the protocol layer, and enqueue remaining data associated with the request on a pending message list for transmission in the future.

* * * * *